(12) United States Patent
Löser et al.

(10) Patent No.: US 6,857,625 B2
(45) Date of Patent: Feb. 22, 2005

(54) SPRING CARRIER

(75) Inventors: Friedrich Löser, Riemerling (DE); Siegfried Ellmann, Aschheim (DE)

(73) Assignee: ThyssenKrupp Automotive AG, Bochum (DE)

(*) Notice: Subject to any disclaimer, the term of this patent is extended or adjusted under 35 U.S.C. 154(b) by 0 days.

(21) Appl. No.: 10/432,416

(22) PCT Filed: Dec. 15, 2001

(86) PCT No.: PCT/EP01/14856
§ 371 (c)(1), (2), (4) Date: May 21, 2003

(87) PCT Pub. No.: WO02/055326
PCT Pub. Date: Jul. 18, 2002

(65) Prior Publication Data
US 2004/0036206 A1 Feb. 26, 2004

(30) Foreign Application Priority Data
Jan. 15, 2001 (DE) .......................... 101 01 694

(51) Int. Cl.$^7$ ................................. F16F 1/12
(52) U.S. Cl. ..................... 267/175; 267/221; 188/299.1
(58) Field of Search .......................... 188/299.1, 266.1, 188/266.2, 266.3; 267/221, 175, 177

(56) References Cited
U.S. PATENT DOCUMENTS 2,904,343 A * 9/1959 Taber ..................... 280/43.18
3,049,359 A * 8/1962 Geyer ..................... 280/6.159
3,603,575 A * 9/1971 Arlasky et al. ............... 267/34
3,829,119 A * 8/1974 Kirschner et al. ........ 280/6.159
3,871,682 A * 3/1975 Kirschner et al. ........ 280/6.159
5,060,959 A * 10/1991 Davis et al. ............. 280/5.514
5,116,016 A * 5/1992 Nagata ..................... 248/578
5,306,031 A * 4/1994 Quinn et al. ............... 280/6.15
5,553,836 A * 9/1996 Ericson ..................... 267/286
5,678,847 A * 10/1997 Izawa et al. ............. 280/5.515

* cited by examiner

Primary Examiner—Robert A. Siconolfi
(74) Attorney, Agent, or Firm—Max Fogiel

(57) ABSTRACT

The invention relates to a spring carrier for the chassis of a motor vehicle. Said carrier is used to support a coil spring (1) which is braced between two spring plates (2, 3). At least one of said spring plates (2) can be axially adjusted by means of a drive unit comprising a gearbox and an electric motor. Preferably, at least one part of the piston rod (6) and/or the shock-absorber tube (5) of a shock-absorber or a suspension strut is arranged inside the coil spring (1). The aim of the invention is to develop one such spring carrier in such a way that the distance between the upper spring end and the vehicle body can be kept small in a cost-effective manner. To this end, the electric motor is embodied in the form of a ring motor having an external stator (15) and an internal rotor (16) which comprises a displacement nut on its inner side, said displacement nut axially displacing a spring plate carrier (21) connected to the spring plate (2) and externally embodied as a threaded spindle.

8 Claims, 2 Drawing Sheets

SPRING CARRIER

BACKGROUND OF THE INVENTION

The present invention concerns a supporting column in the form of a spring with at least one spring-end cap that can be displaced toward the wheel or toward the chassis of a vehicle.

Such axially adjustable supporting columns are employed in vehicles with chassis that are intended to be elevated to varying levels above the ground. This feature can be desirable for example once a vehicle has been loaded and the intrusion of its rear suspension must be compensated. Such supporting columns, however, are also employed in on-and-off road vehicles to increase above ground clearance in rough terrains. Furthermore, these supporting columns can be employed in busses that kneel toward the curb at bus stops. Finally, Dynamic rocking and rolling on the part of the chassis can also be eliminated, enabling a level orientation independent of the road surface.

A supporting column of this genus is known from German 19 510 032 A1. It has a drawback in that it requires a lot of overhead between the chassis and the upper spring cap, and the dashpot's or telescoping leg's piston rod must be especially long and accordingly liable to bending, which makes the supporting column impractical for telescoping legs. Finally, the embodiment in question requires a large number of mechanical components and is accordingly more expensive to manufacture.

SUMMARY OF THE INVENTION

The object of the present invention is accordingly a supporting column in the form of a generic upright spring improved to the extent that the distance between the upper end of the spring and the vehicle's chassis can be short, whereby the supporting column will also be inexpensive to manufacture.

One advantage of the supporting column in accordance with the present invention is that it needs no extra overhead clearance and can accordingly be employed unadapted with conventional telescoping legs. Furthermore, when employed with conventional combinations of telescoping leg and dashpot, these devices need not be specially designed to accommodate an axially adjustable supporting column instead of an ordinary resilient supporting column. Finally, the supporting column in accordance with the present invention comprises only a few components and will accordingly be inexpensive to manufacture.

One embodiment of the present invention will now be specified with reference to the attached drawing, wherein

DESCRIPTION OF THE PREFERRED EMBODIMENTS

Figure 1:
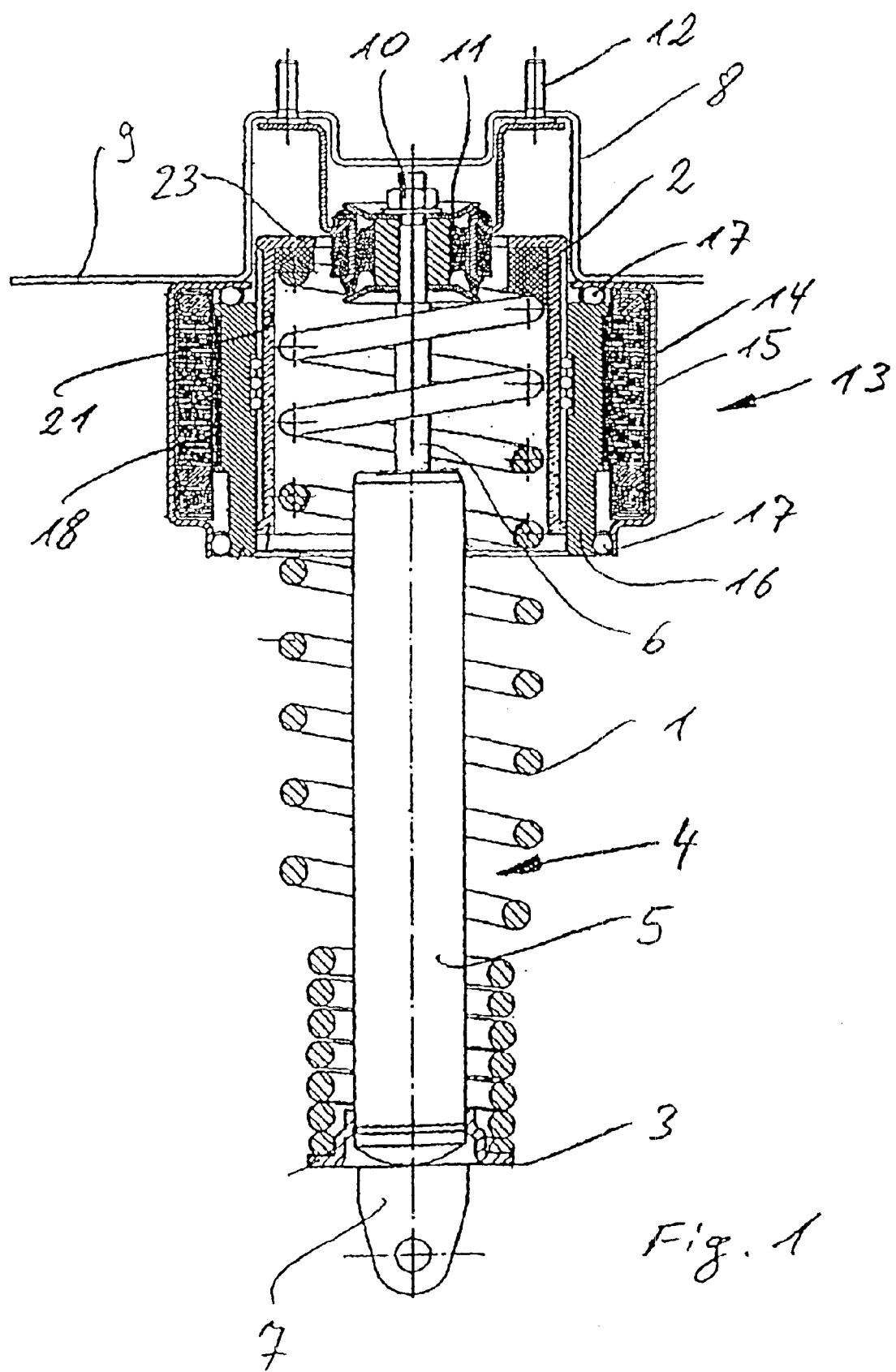
FIG. 1 is a longitudinal section through a supporting column in the form of an upright spring and FIG. 2 is a larger-scale illustration of the axial adjuster.

The supporting column depicted in FIG. 1 comprises a helical spring 1. One end of spring 1 rests against a cap 2 and the other end against another cap 3. A dashpot 4 is accommodated inside spring 1 along its central axis. Dashpot 4 comprises a cylinder and a piston rod 6. Piston rod 6 travels in and out of cylinder 5. Cap 3 is secured to the lower end of cylinder 5 by a groove and tensioning ring. The overall supporting column is connected to the wheel suspension by a flange 7.

Figure 2:
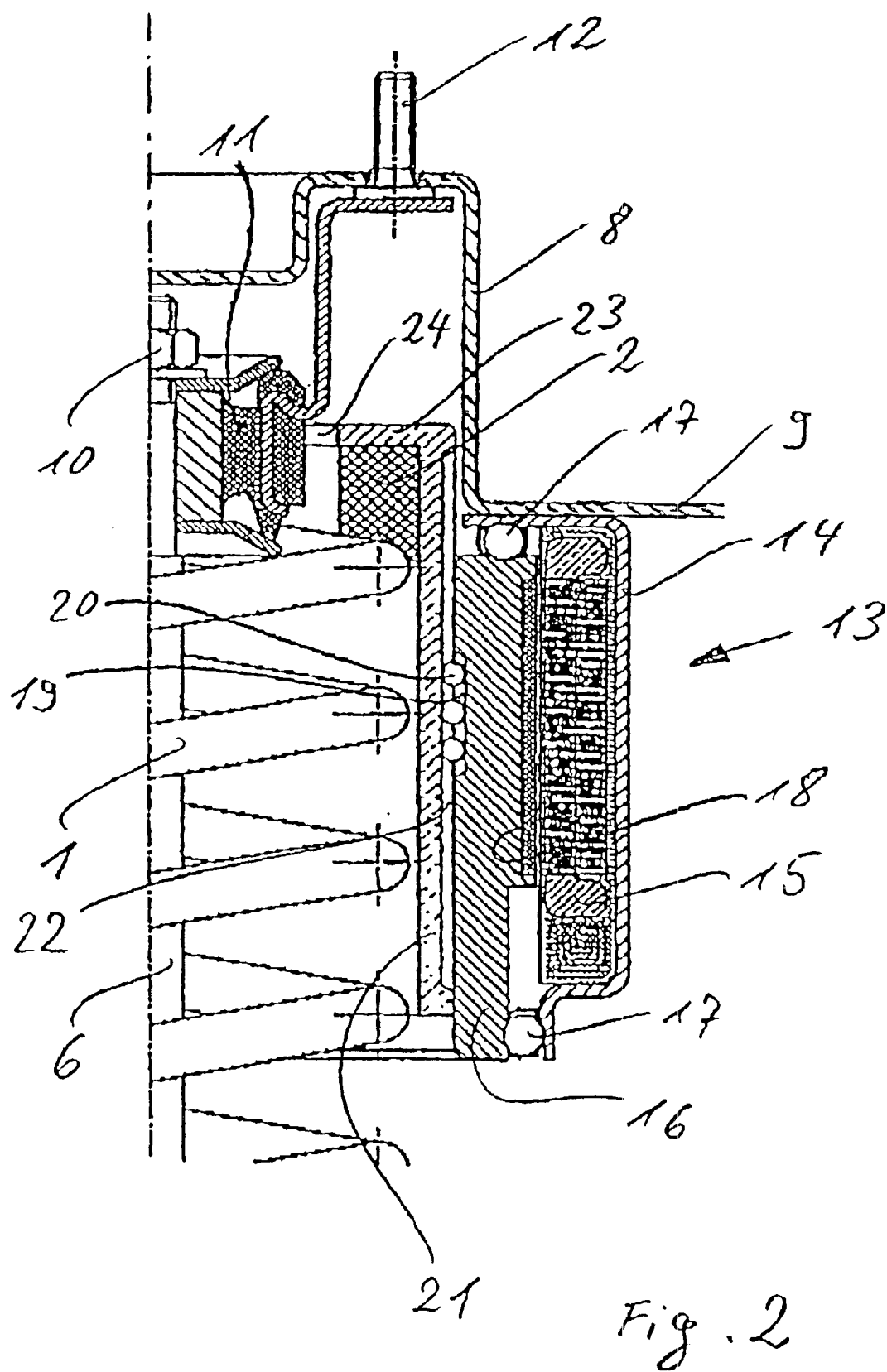

Half of the upper part of the joint between piston rod 6 and spring 1 and the axial adjuster or chassis is depicted in larger scale section in FIG. 2. Piston rod 6 is conventionally attached to an arbor-like dome 8 on one component 9 of the chassis. Piston rod 6 is for this purpose is fastened by a nut 10 to a flexible and resilient connector half 11. Connector half 11 itself is fastened to dome 8 by screws 12.

The outer housing 14 of an axial adjuster 13 rests against the bottom of component 9 and is attached to it by unillustrated means, which can, however, comprise resilient and shock-absorbing components. Outer housing 14 can alternatively be accommodated inside dome 8.

The stator 15 of an annular motor is accommodated in outer housing 14. Stator 15 essentially comprises electric windings that generate in conjunction with stacks of sheetmetal an electric field. The windings and stacks can be embedded along with any requisite sensors and electric or electronic components of a detection-and-control stage in self-curing plastic in outer housing 14.

The motor's rotor 16 rotates on ball bearings 17 on stator 15. The surface of rotor 16 is provided with permanent magnets 18 that operate in electromagnetic conjunction with the windings and sheetmetal stacks. Electric coils can, however, be alternatively employed when practical for a particular motor application. The rotor itself is integrated directly with into the races in ball bearings 17 and has the nut-proximate races 19 of a ball-in-spiral spindle mounted on its inner surface. Rotor 16 is connected by way of its associated balls 20 with a spring-end cap holder 21. The outer surface of spring-cap holder 21 is itself connected to the spindle-end races 22 of a ball-in-spiral spindle. Since spring-end cap holder 21 is prevented from rotating because of its contact against spring 1, it will move axially as rotor 16 rotates, up or down in accordance with the sense of rotation. To allow a shorter overall diameter, the rotor magnets can be displaced nearer the spindle.

Spring-end cap holder 21 can be further prevented from rotating by appropriate guides, mounted on dome 8 for example, although this approach is not necessary.

Spring 1 is accommodated inside spring-end cap holder 21, which is tubular and terminates in front of upper cap 2. Upper cap 2 rests axially against a cylinder base 23 at the spring-remote end of spring-end cap holder 21. There is a bore 24 through the center of base 23, which can accordingly radially overlap and axially travel over, allowing upper cap 2 to enter dome 8.

What is claimed is:

1. A motor vehicle drive arrangement comprising: a spring carrier; two spring caps; a helical spring tensioned between two spring caps supported by said spring carrier; a damping tube; a piston rod connected to a chassis of the vehicle; a shock absorber having a region of said piston rod within said helical spring; electrical motor means with drive means for displacing axially at least one of said spring caps; said electrical motor comprising an annular motor with an external stator surrounding an internally threaded rotor; a motion-limiting nut carried inside said rotor and driven by said external stator; a spring cap holder connected to one of said spring caps and being in form of an outside threaded spindle, said motion limiting nut displacing axially said spring cap holder; said spring cap holder having a base with a central opening for supporting said one of said spring caps.

2. A motor vehicle drive arrangement as defined in claim 1, wherein said motion-controlling nut and said spring cap holder comprise a spindle with a spiral groove accommodating a ball.

3. A motor vehicle drive arrangement as defined in claim 1, wherein said rotor and said nut are in one piece.

4. A motor vehicle drive arrangement as defined in claim 1, wherein said motor is an induction motor.

5. A motor vehicle drive arrangement as defined in claim 1, wherein said spring cap holder is tubular, one section of said spring being inside said spring cap holder.

6. A motor vehicle drive arrangement as defined in claim 5, wherein said spring cap is inside said spring cap holder in an end remote from said spring.

7. A motor vehicle drive arrangement as defined in claim 1, wherein said spring cap holder and said spring cap are in a single piece.

8. A motor vehicle drive arrangement comprising: a spring carrier; two spring caps; a helical spring tensioned between two spring caps supported by said spring carrier; a damping tube; a piston rod connected to a chassis of the vehicle; a shock absorber having a region of said piston rod within said helical spring; electrical motor means with drive means for displacing axially at least one of said spring caps; said electrical motor comprising an annular motor with an external stator surrounding an internally threaded rotor; a motion-limiting nut carried inside said rotor and driven by said external stator; a spring cap holder connected to one of said spring caps and being in form of an outside threaded spindle, said motion limiting nut displacing axially said spring cap holder; said spring cap holder having a base with a central opening for supporting said one of said spring caps; said motion limiting nut and said spring cap holder comprising a spindle with a spiral groove accommodating a ball; said rotor and nut being in one piece; said motor comprising an induction motor; said spring cap holder being tubular, one section of said spring being inside said spring cap holder; said spring cap being inside said spring cap holder in the end remote from said spring; said spring cap holder and said spring cap being of a single piece.

* * * * *